US009253843B2

(12) United States Patent
Lee et al.

(10) Patent No.: US 9,253,843 B2
(45) Date of Patent: Feb. 2, 2016

(54) DRIVING CIRCUIT WITH DIMMING CONTROLLER FOR DRIVING LIGHT SOURCES

(71) Applicant: O2Micro Inc., Santa Clara, CA (US)

(72) Inventors: Sheng-Tai Lee, Taipei (TW); Ching-Chuan Kuo, Taiper (TW); Yung-Lin Lin, Palo Alto, CA (US)

(73) Assignee: 02Micro Inc, Santa Clara, CA (US)

( * ) Notice: Subject to any disclaimer, the term of this patent is extended or adjusted under 35 U.S.C. 154(b) by 0 days.

(21) Appl. No.: 14/509,711

(22) Filed: Oct. 8, 2014

(65) Prior Publication Data

US 2015/0022109 A1    Jan. 22, 2015

Related U.S. Application Data

(63) Continuation-in-part of application No. 13/922,826, filed on Jun. 20, 2013, which is a continuation-in-part of application No. 13/559,451, filed on Jul. 26, 2012, which is a continuation-in-part of application No.

(Continued)

(51) Int. Cl.
*H05B 37/00*  (2006.01)
*H05B 39/00*  (2006.01)
*H05B 41/14*  (2006.01)
*H05B 33/08*  (2006.01)

(52) U.S. Cl.
CPC ........ *H05B 33/0845* (2013.01); *H05B 33/0812* (2013.01); *H05B 33/0818* (2013.01); *H05B 33/0851* (2013.01); *H05B 33/0848* (2013.01)

(58) Field of Classification Search
CPC ................................................ H05B 33/0803
USPC ...................... 315/291–311, 200 R
See application file for complete search history.

(56) References Cited

U.S. PATENT DOCUMENTS 5,691,605 A    11/1997    Xia et al.
5,959,443 A    9/1999     Littlefield
6,304,464 B1   10/2001    Jacobs et al.
(Continued)

FOREIGN PATENT DOCUMENTS

CN    1498055 A    5/2004
CN    1694597 A    11/2005
(Continued)

OTHER PUBLICATIONS

The datasheet describes an Universal High Brightness LED driver HV9910B from Supertex Inc.

(Continued)

*Primary Examiner* — Sibin Chen
*Assistant Examiner* — Metasebia Retebo

(57) ABSTRACT

A driving circuit includes a power converter, a dimming controller and a current path coupled to the dimming controller. The power converter receives input power from a rectifier and provides output power to a light source. A power switch transfers power from an AC power source to the rectifier when the power switch is on. The dimming controller receives a switch monitoring signal indicative of the state of the power switch. An average current flowing through the light source has a first value if the power switch is on. The dimming controller is operable for adjusting the average current based on the switch monitoring signal. A current flows from the AC power source through the current path to ground when the power switch is off.

12 Claims, 8 Drawing Sheets

Related U.S. Application Data

13/100,434, filed on May 4, 2011, now Pat. No. 8,339,067, which is a continuation-in-part of application No. 12/415,028, filed on Mar. 31, 2009, now Pat. No. 8,076,867, which is a continuation-in-part of application No. 12/316,480, filed on Dec. 12, 2008, now Pat. No. 8,044,608.

(56) References Cited

U.S. PATENT DOCUMENTS

| | | |
|---|---|---|
| 6,320,330 B1 | 11/2001 | Haavisto et al. |
| 6,727,662 B2 | 4/2004 | Konopka et al. |
| 6,839,247 B1 | 1/2005 | Yang et al. |
| 6,946,819 B2 | 9/2005 | Fagnani et al. |
| 6,975,078 B2 | 12/2005 | Yanai et al. |
| 6,984,963 B2 | 1/2006 | Pidutti et al. |
| 7,084,582 B2 | 8/2006 | Buonocunto |
| 7,141,940 B2 | 11/2006 | Ortiz |
| 7,148,664 B2 | 12/2006 | Takahashi et al. |
| 7,180,274 B2 | 2/2007 | Chen et al. |
| 7,190,124 B2 | 3/2007 | Kumar et al. |
| 7,259,527 B2 | 8/2007 | Foo |
| 7,288,902 B1 | 10/2007 | Melanson |
| 7,304,464 B2 | 12/2007 | Weng et al. |
| 7,307,614 B2 | 12/2007 | Vinn |
| 7,312,783 B2 | 12/2007 | Oyama |
| 7,323,828 B2 | 1/2008 | Russell et al. |
| 7,394,209 B2 | 7/2008 | Lin et al. |
| 7,466,082 B1 | 12/2008 | Snyder et al. |
| 7,639,517 B2 | 12/2009 | Zhou et al. |
| 7,649,325 B2 | 1/2010 | McIntosh et al. |
| 7,710,084 B1 | 5/2010 | Guo |
| 7,714,464 B2 | 5/2010 | Tsai et al. |
| 7,759,881 B1 * | 7/2010 | Melanson .......... H05B 33/0815 315/224 |
| 7,800,315 B2 | 9/2010 | Shteynberg et al. |
| 7,804,256 B2 | 9/2010 | Melanson |
| 7,852,017 B1 | 12/2010 | Melanson |
| 7,863,828 B2 | 1/2011 | Melanson |
| 7,888,922 B2 | 2/2011 | Melanson |
| 7,944,153 B2 | 5/2011 | Greenfeld |
| 8,076,867 B2 | 12/2011 | Kuo et al. |
| 8,085,005 B2 | 12/2011 | Dearn |
| 8,232,780 B2 | 7/2012 | Uno |
| 8,237,371 B2 | 8/2012 | Lin et al. |
| 8,274,800 B2 | 9/2012 | Uno et al. |
| 8,339,063 B2 | 12/2012 | Yan et al. |
| 8,344,657 B2 | 1/2013 | Zhan et al. |
| 8,378,588 B2 | 2/2013 | Kuo et al. |
| 8,379,413 B2 | 2/2013 | Ren et al. |
| 8,669,721 B2 | 3/2014 | Watanabe et al. |
| 2001/0005319 A1 | 6/2001 | Ohishi et al. |
| 2003/0048632 A1 | 3/2003 | Archer |
| 2003/0107332 A1 | 6/2003 | Newman et al. |
| 2004/0085030 A1 | 5/2004 | Laflamme et al. |
| 2004/0130271 A1 | 7/2004 | Sekoguchi et al. |
| 2004/0218410 A1 | 11/2004 | Yamada et al. |
| 2005/0017691 A1 | 1/2005 | Aradachi et al. |
| 2006/0072324 A1 | 4/2006 | Hachiya et al. |
| 2006/0139907 A1 | 6/2006 | Yen |
| 2007/0047276 A1 | 3/2007 | Lin et al. |
| 2007/0182347 A1 | 8/2007 | Shteynberg et al. |
| 2007/0210725 A1 | 9/2007 | Marosek |
| 2007/0262724 A1 | 11/2007 | Mednik |
| 2008/0018261 A1 | 1/2008 | Kastner |
| 2008/0030153 A1 | 2/2008 | Mizuno |
| 2008/0180075 A1 | 7/2008 | Xie et al. |
| 2008/0203946 A1 | 8/2008 | Ito et al. |
| 2008/0224631 A1 | 9/2008 | Melanson |
| 2008/0258641 A1 | 10/2008 | Nakagawa et al. |
| 2008/0258647 A1 | 10/2008 | Scianna |
| 2008/0259655 A1 | 10/2008 | Wei et al. |
| 2008/0278092 A1 | 11/2008 | Lys et al. |
| 2008/0297068 A1 | 12/2008 | Koren et al. |
| 2009/0167187 A1 | 7/2009 | Kitagawa et al. |
| 2009/0184662 A1 | 7/2009 | Given et al. |
| 2009/0189548 A1 | 7/2009 | Hoffman et al. |
| 2009/0195180 A1 | 8/2009 | Chenetz |
| 2009/0224686 A1 | 9/2009 | Kunimatsu |
| 2009/0251059 A1 | 10/2009 | Veltman |
| 2009/0251071 A1 | 10/2009 | Gater et al. |
| 2009/0295303 A1 | 12/2009 | Pucko et al. |
| 2009/0309501 A1 | 12/2009 | Catalano et al. |
| 2009/0315480 A1 | 12/2009 | Yan et al. |
| 2009/0322254 A1 | 12/2009 | Lin |
| 2009/0322255 A1 | 12/2009 | Lin |
| 2010/0007292 A1 | 1/2010 | Horino |
| 2010/0013409 A1 | 1/2010 | Quek et al. |
| 2010/0026191 A1 | 2/2010 | Radermacher et al. |
| 2010/0141177 A1 | 6/2010 | Negrete et al. |
| 2010/0219766 A1 | 9/2010 | Kuo et al. |
| 2010/0265745 A1 | 10/2010 | Xu et al. |
| 2010/0308733 A1 | 12/2010 | Shao |
| 2011/0001766 A1 | 1/2011 | Hua et al. |
| 2011/0013437 A1 | 1/2011 | Uruno et al. |
| 2011/0037399 A1 | 2/2011 | Hung et al. |
| 2011/0050185 A1 | 3/2011 | Notman et al. |
| 2011/0109228 A1 | 5/2011 | Shimomura et al. |
| 2011/0109230 A1 | 5/2011 | Simi |
| 2011/0115407 A1 | 5/2011 | Wibben et al. |
| 2011/0128303 A1 | 6/2011 | Yonemaru et al. |
| 2011/0133665 A1 | 6/2011 | Huang |
| 2011/0140620 A1 | 6/2011 | Lin et al. |
| 2011/0140630 A1 | 6/2011 | Doudousakis et al. |
| 2011/0227506 A1 | 9/2011 | Ren et al. |
| 2011/0285307 A1 | 11/2011 | Kimura et al. |
| 2011/0298374 A1 | 12/2011 | Lenk et al. |
| 2012/0038292 A1 * | 2/2012 | Kuo ................. H05B 33/0818 315/297 |
| 2012/0062138 A1 | 3/2012 | Wilson et al. |
| 2012/0069606 A1 | 3/2012 | Sagneri et al. |
| 2012/0081018 A1 | 4/2012 | Shteynberg et al. |
| 2012/0081029 A1 | 4/2012 | Choi et al. |
| 2012/0139422 A1 * | 6/2012 | Ren ................... H05B 33/0815 315/126 |
| 2012/0139433 A1 | 6/2012 | Yan et al. |
| 2012/0146532 A1 | 6/2012 | Ivey et al. |
| 2012/0217894 A1 | 8/2012 | Chang et al. |
| 2012/0242247 A1 | 9/2012 | Hartmann et al. |
| 2012/0262079 A1 | 10/2012 | Lin et al. |
| 2012/0268023 A1 | 10/2012 | Yan et al. |
| 2012/0293087 A1 | 11/2012 | Matsuda et al. |
| 2013/0033197 A1 | 2/2013 | Hwang et al. |
| 2013/0043801 A1 | 2/2013 | Kuwu |
| 2013/0049621 A1 | 2/2013 | Yan et al. |
| 2013/0147379 A1 | 6/2013 | Zhou et al. |
| 2013/0200814 A1 | 8/2013 | Chen et al. |
| 2013/0278145 A1 | 10/2013 | Lin et al. |
| 2014/0145632 A1 | 5/2014 | Wey |

FOREIGN PATENT DOCUMENTS

| | | |
|---|---|---|
| CN | 1760721 A | 4/2006 |
| CN | 101176386 A | 5/2008 |
| CN | 101179879 A | 5/2008 |
| CN | 101193486 A | 6/2008 |
| CN | 101222800 A | 7/2008 |
| CN | 101242143 A | 8/2008 |
| CN | 101370335 A | 2/2009 |
| CN | 101378207 A | 3/2009 |
| CN | 101466186 A | 6/2009 |
| CN | 101472368 A | 7/2009 |
| CN | 101489335 A | 7/2009 |
| CN | 101500354 A | 8/2009 |
| CN | 101511136 A | 8/2009 |
| CN | 101572974 A | 11/2009 |
| CN | 101605413 A | 12/2009 |
| CN | 101605416 A | 12/2009 |
| CN | 201491339 U | 5/2010 |
| CN | 101742771 A | 6/2010 |
| CN | 101801129 A | 8/2010 |
| CN | 101815383 A | 8/2010 |
| CN | 101815391 A | 8/2010 |
| CN | 101854759 A | 10/2010 |

(56) References Cited

FOREIGN PATENT DOCUMENTS

| | | |
|---|---|---|
| CN | 201611973 U | 10/2010 |
| CN | 201682668 U | 12/2010 |
| CN | 101998726 A | 3/2011 |
| CN | 102014540 A | 4/2011 |
| CN | 102056378 A | 5/2011 |
| CN | 102118906 A | 7/2011 |
| CN | 202050564 U | 11/2011 |
| CN | 102332814 A | 1/2012 |
| CN | 102387639 A | 3/2012 |
| CN | 102438377 A | 5/2012 |
| CN | 102522066 A | 6/2012 |
| CN | 102523650 A | 6/2012 |
| CN | 102695329 A | 9/2012 |
| CN | 102696282 A | 9/2012 |
| CN | 102811530 A | 12/2012 |
| CN | 102811531 A | 12/2012 |
| DE | 29904988 U1 | 6/1999 |
| EP | 1565042 A2 | 8/2005 |
| EP | 2026634 A1 | 2/2009 |
| EP | 2031942 A2 | 3/2009 |
| EP | 2214457 A1 | 8/2010 |
| EP | 2273851 A2 | 1/2011 |
| EP | 2320710 A1 | 5/2011 |
| EP | 2533606 A1 | 12/2012 |
| GB | 2482371 A | 2/2012 |
| GB | 2493054 A | 1/2013 |
| GB | 2501134 A | 10/2013 |
| JP | 10070846 A | 3/1998 |
| JP | 2001185371 A | 7/2001 |
| JP | 2001245436 A | 9/2001 |
| JP | 2008210536 A | 9/2008 |
| JP | 2010140823 A | 6/2010 |
| JP | 2010140824 A | 6/2010 |
| JP | 2010282757 A | 12/2010 |
| JP | 2011009701 A | 1/2011 |
| TW | M390631 U | 10/2010 |
| TW | M399572 U | 3/2011 |
| TW | 201228458 A | 7/2012 |
| WO | 2006006085 A1 | 1/2006 |
| WO | 2008001246 A1 | 1/2008 |
| WO | 2010148329 A1 | 12/2010 |
| WO | 2011048214 A1 | 4/2011 |

OTHER PUBLICATIONS

The datasheet describes a PWM high efficiency LED driver controller A704 from ADDtek Corp., Aug. 2008.
European search report dated Oct. 4, 2013 issued in European Patent Application No. 12161538.9 (9 pages).
Japanese Office Action dated Oct. 15, 2013 issued in Japanese Patent Application 2010-258837 (3 pages).
Datasheet of "Close Loop LED Driver with Enhanced PWM Dimming" from SUPERTEX INC, Dec. 31, 2009, pp. 1-12, XP002714011, CA, 94089, US.
Application Report of "Driving High-Current LEDs" from Texas Instrument, Jan. 31, 2007, pp. 1-8, XP002714012.
GB Office Action dated Jan. 14, 2013 issued in related GB patent Application No. 1313787.2 (5 pages).
European Search Report dated Dec. 11, 2013 issued in related patent Application No. 13150915.0 (5 pages).
Combined Search and Examination Report dated Jun. 26, 2014 issued for British Patent Application No. 1405042.1.

* cited by examiner

DRIVING CIRCUIT WITH DIMMING CONTROLLER FOR DRIVING LIGHT SOURCES

RELATED APPLICATIONS

This application is a continuation-in-part of the co-pending U.S. patent application Ser. No. 13/922,826, filed on Jun. 20, 2013, entitled "Circuits and Methods for Driving Light Sources," which itself is a continuation-in-part of the co-pending U.S. patent application Ser. No. 13/559,451, filed on Jul. 26, 2012, entitled "Circuits and Methods for Driving Light Sources," which itself is a continuation-in-part of the co-pending U.S. patent application Ser. No. 13/100,434, filed on May 4, 2011, entitled "Circuits and Methods for Driving Light Sources" (now U.S. Pat. No. 8,339,067), which itself is a continuation-in-part of the U.S. patent application Ser. No. 12/415,028, filed on Mar. 31, 2009, entitled "Driving Circuit with Continuous Dimming Function for Driving Light Sources" (now U.S. Pat. No. 8,076,867), which itself is a continuation-in-part of the U.S. patent application Ser. No. 12/316,480, filed on Dec. 12, 2008, entitled "Driving Circuit with Dimming Controller for Driving Light Sources" (now U.S. Pat. No. 8,044,608), and all of which are fully incorporated herein by reference.

BACKGROUND ART

In recent years, light sources such as light emitting diodes (LEDs) have been improved through technological advances in material and in manufacturing processes. LEDs possess relatively high efficiency, long life, and vivid colors, and can be used in a variety of industries including the automotive, computer, telecom, military and consumer goods industries, etc. One example application is an LED lamp which uses LEDs to replace traditional light sources such as filaments.

FIG. 1 shows a schematic diagram of a conventional LED driving circuit 100. The LED driving circuit 100 utilizes an LED string 106 as a light source. The LED string 106 includes a group of LEDs connected in series. A power converter 102 converts an input voltage Vin to a desired output DC voltage Vout to power the LED string 106. A switch 104 coupled to the power converter 102 can enable or disable the input voltage Vin to the LED string 106, and therefore can turn on or turn off the LED lamp. The power converter 102 receives a feedback signal from a current sensing resistor Rsen and adjusts the output voltage Vout to make the LED string 106 generate a desired light output. One of the drawbacks of this solution is that the light output of the LED string 106 is set to a predetermined level and may not be adjusted by users.

FIG. 2 illustrates a schematic diagram of another conventional LED driving circuit 200. A power converter 102 converts an input voltage Vin to a desired output DC voltage Vout to power the LED string 106. A switch 104 coupled to the power converter 102 can enable or disable the input voltage Vin to the LED string 106, and therefore can turn on or turn off the LED lamp. The LED string 106 is coupled to a linear LED current regulator 208. An operational amplifier 210 in the linear LED current regulator 208 compares a reference signal REF and a current monitoring signal from current sensing resistor Rsen, and generates a control signal to adjust the resistance of the transistor 202 in a linear mode. Therefore, the LED current flowing through the LED string 106 can be adjusted accordingly. In this solution, in order to control the light output of the LED string 106, users may need to use a dedicated apparatus, such as a specially designed switch with adjusting buttons or a switch that can receive a remote control signal, to adjust the reference signal REF.

SUMMARY

In a first embodiment according to the invention, a dimming controller for controlling dimming of a light source includes a monitoring terminal operable for receiving a switch monitoring signal indicative of an on/off state of a power switch (e.g., the power switch is on or off). The power switch transfers power from an AC power source to a rectifier when the power switch is on. The power converter receives input power from the rectifier and provides output power to the light source when the power switch is on. An average current flowing through the light source has a first value if the power switch is on. In this embodiment, the dimming controller also includes a control terminal operable for providing a control signal to adjust the average current based on the switch monitoring signal and control dimming of the light source. In this embodiment, the dimming controller also includes a power terminal operable for receiving power from the AC power source through the power switch when the power switch is on, and operable for receiving power from the AC power source through an illuminated indicator when the power switch is off.

In a second embodiment according to the invention, a driving circuit for controlling power of a light source includes a power converter, a dimming controller and a current path coupled to the dimming controller. The power converter is operable for receiving input power from a rectifier and providing output power to a light source. A power switch transfers power from an AC power source to the rectifier when the power switch is on. The dimming controller is coupled to the power converter and is operable for receiving a switch monitoring signal indicative of an on/off state of the power switch (e.g., the power switch is on or off). An average current flowing through the light source has a first value if the power switch is on. The dimming controller is operable for adjusting the average current based on the switch monitoring signal and controlling dimming of the light source. A current flows from the AC power source through the current path to ground when the power switch is off.

In a third embodiment according to the invention pertains to a method for adjusting power of a light source. The light source is powered by a rectified voltage from a rectifier. A switch monitoring signal indicative of an on/off state of a power switch that transfers power from an AC power source to the rectifier is received. An average current flowing through the light source is regulated at a first value if the power switch is on. A time period between the time when the power switch is turned off and the next time it is turned on is measured. The average current flowing through the light source is adjusted based on the switch monitoring signal and the measured time period.

BRIEF DESCRIPTION OF THE DRAWINGS

Features and advantages of embodiments of the invention will become apparent as the following detailed description proceeds, and upon reference to the drawings, where like numerals depict like elements, and in which.

DETAILED DESCRIPTION

Reference will now be made in detail to embodiments according to the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention. In the example embodiments described herein, LED strings are used as examples of light sources for illustration purposes. However, the driving circuits disclosed herein can be used to drive various loads and light sources and are not limited to LED strings.

Figure 1:
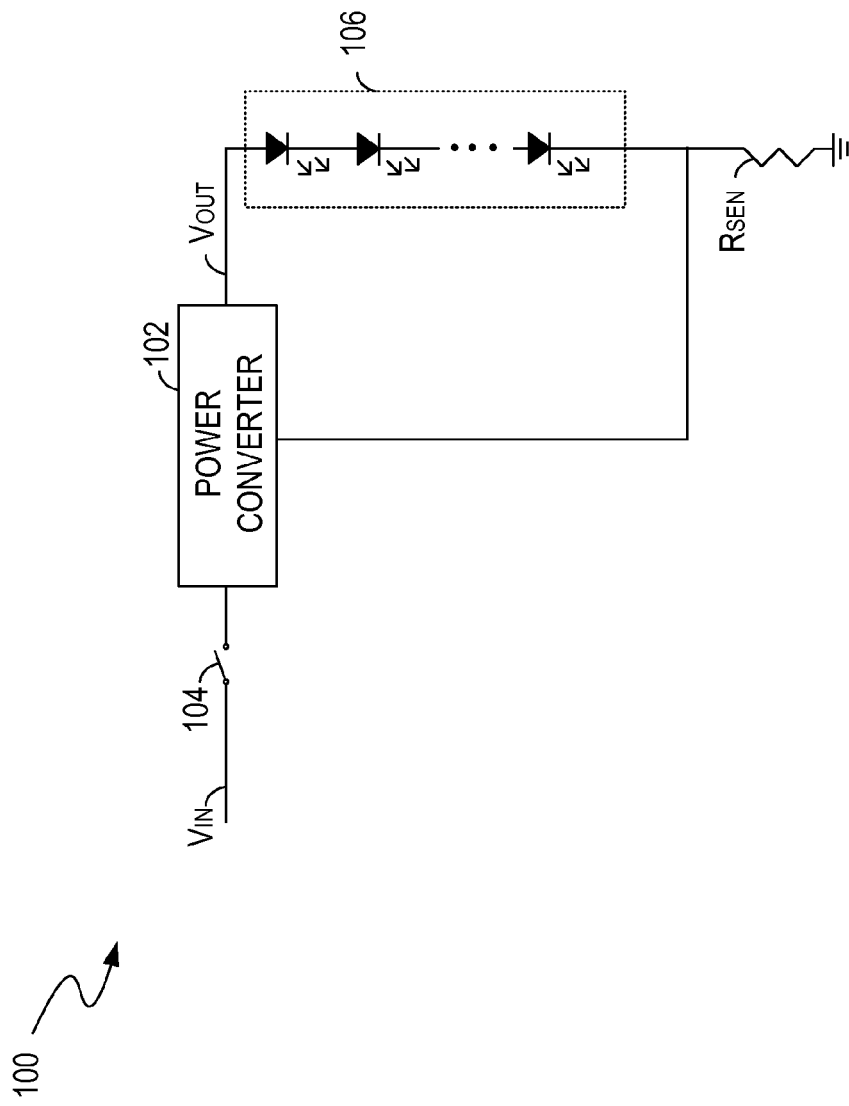
FIG. 1 shows a schematic diagram of a conventional LED driving circuit.
Figure 2:
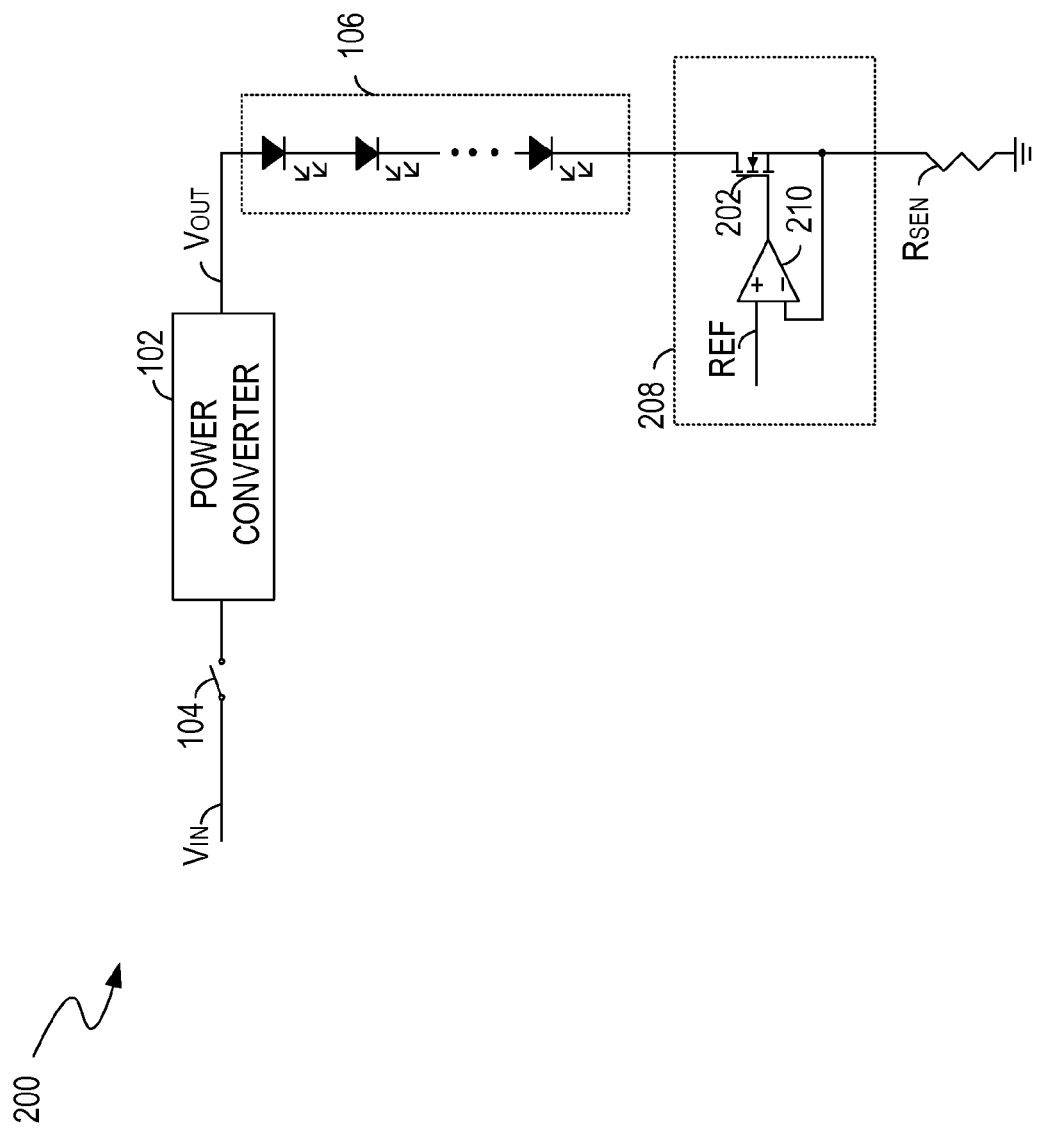
FIG. 2 shows a schematic diagram of another conventional LED driving circuit.
Figure 3:
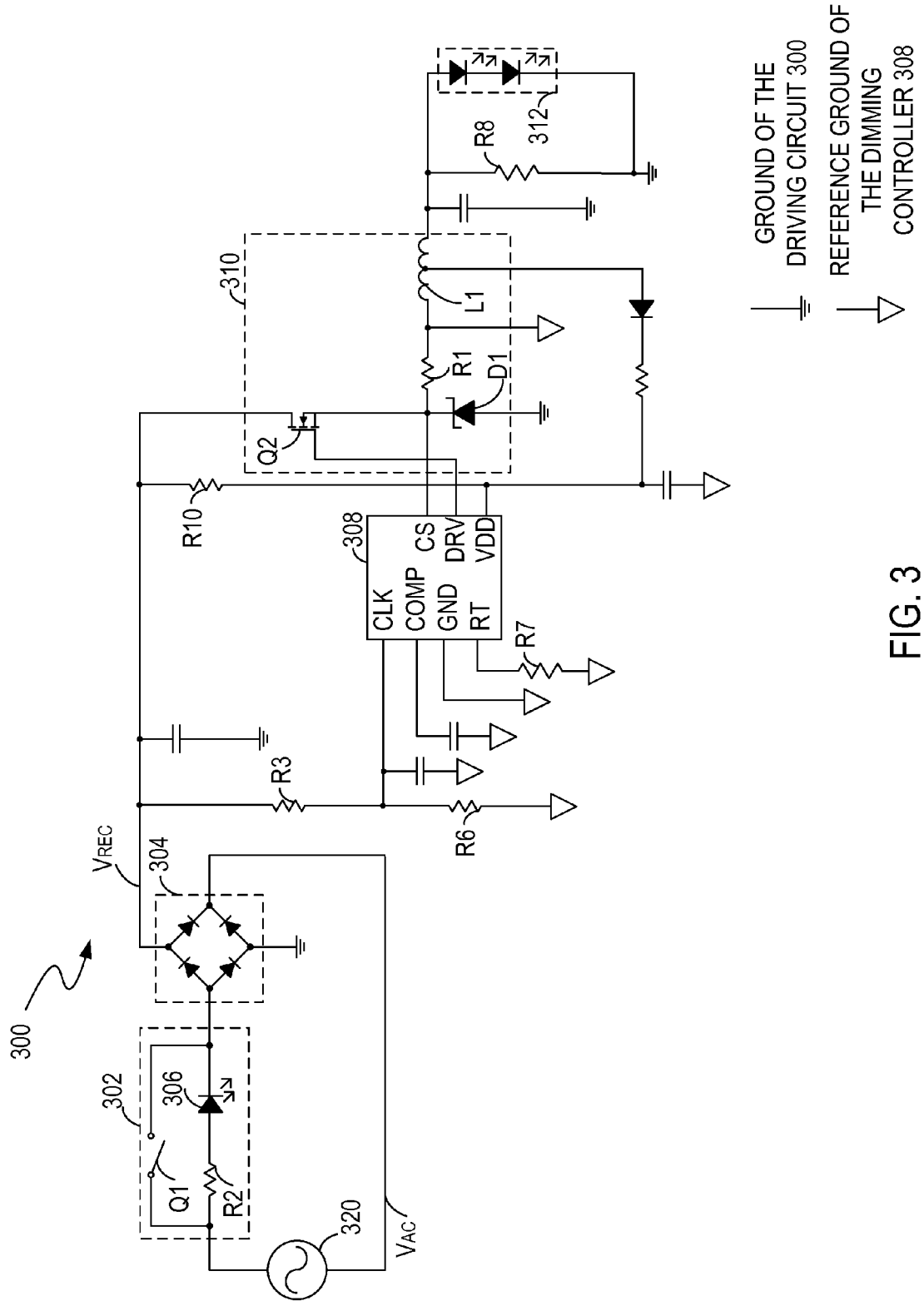
FIG. 3 shows an example of a schematic diagram of a light source driving circuit, in an embodiment according to the present invention.

FIG. 3 shows an example of a schematic diagram of a light source driving circuit 300, in an embodiment according to the present invention.

The light source driving circuit 300 includes a rectifier (e.g., a bridge rectifier) 304 coupled to an AC power source 320 through an illuminated switch 302. The illuminated switch 302 can be installed, for example, in a wall; the switch can be used to control lights in a home, for example. The illuminated switch 302 includes an illuminating indicator, e.g., an LED 306 as shown in FIG. 3, or another type of light source such as a neon lamp. The LED 306 is coupled to a resistor R2 in series. The illuminated switch 302 further includes a power switch Q1 coupled between the AC power source 320 and the rectifier 304. In an embodiment, the power switch Q1 is analogous to an on/off switch that can be installed, for example, in a wall of a home. The power switch Q1 is also coupled in parallel with the LED 306 and the resistor R2. Power is transferred from the AC power source 320 to the rectifier 304 if the power switch Q1 is in the on position. If the power switch Q1 is in the off position, then a current flows from the AC power source 320 through a current path to ground. The current path can include the resistor R2, the LED 306, the rectifier 304, the resistor R10, the inductor L1 and the resistor R8. Accordingly, the LED 306 is turned on, which allows a user to locate the switch 302 in the dark.

The light source driving circuit 300 includes a power converter 310 that receives input power from the rectifier 304 and provides output power to a light source (e.g., an LED string 312). In the example of FIG. 3, the power converter 310 includes a switch Q2, an inductor L1 and a diode D1. A dimming controller 308 is coupled to the power converter 310 and is operable for receiving a switch monitoring signal indicative of the position or state of the power switch Q1. The position or state of the power switch Q1 is selected from a group that includes an on position (the switch is "on" or "turned on") and an off position (the switch is "off" or "turned off"). The dimming controller 308 can adjust an average current flowing through the LED string 312 based on the switch monitoring signal so as to control dimming of the LED string 312. Furthermore, the dimming controller 308 is coupled to the current path described above which includes the resistor R2, the LED 306, the rectifier 304, the resistor R10, the inductor L1 and the resistor R8. Therefore, the dimming controller 308 remains powered on when the power switch Q1 is off. The light source driving circuit 300 further includes a current sensor R1 that provides a current monitoring signal ISEN (shown in FIG. 4) indicating an amount of current flowing through the LED string 312.

In one embodiment, terminals of the dimming controller 308 can include CLK, RT, COMP, VDD, CS, DRV and GND.

The monitoring terminal CLK is coupled to the rectifier 304 through a resistor R3, and is coupled to reference ground of the controller 308 through a resistor R6. The monitoring terminal CLK can receive a switch monitoring signal indicating the state or position of the power switch Q1. The state or position of the power switch Q1 is selected from a group that includes on and off. In one embodiment, the switch monitoring signal can be generated at a common node between the resistor R3 and the resistor R6. The terminal RT is coupled to reference ground of the driving circuit 300 through a resistor R7. The resistance of the resistor R7 determines a charging current of a capacitor (not shown in FIG. 3) in the dimming controller 308 and in turn determines a frequency of a pulse signal generated by the dimming controller 308.

The power terminal VDD is coupled to the AC power source 320 through the rectifier 304 and the illuminated switch 302, and supplies power to the dimming controller 308. The power terminal VDD receives power from the AC power source 320 through the rectifier 304 and the power switch Q1 when the power switch Q1 is on, and receives power from the AC power source 320 through the rectifier 304 and the illuminated indicator (e.g., the LED 306) when the power switch Q1 is off.

The control terminal DRV is coupled to the switch Q2. The dimming controller 308 is operable for providing a control signal based on the switch monitoring signal to control the switch Q2 via the terminal CTRL, to adjust the average current flowing through the LED string 312. The terminal CS is coupled to the current sensor R1, and receives a current monitoring signal indicating a current flowing through the LED string 312. The terminal COMP is coupled to reference ground of the dimming controller 308 through a capacitor. The terminal GND is coupled to reference ground of the dimming controller 308.

In one embodiment, there can be three predetermined threshold voltages for the dimming controller 308: VDD_ON, VDD_OFF and VDD_RESET. If the voltage at the terminal VDD is greater than VDD_ON (e.g., 15 V), then the dimming controller 308 is powered on, and controls the switch Q2 to turn on the LED string 312 and regulates an average current of the LED string 312. If the voltage at the terminal VDD decreases from a level above VDD_ON to a level below VDD_OFF (e.g., 9 V), the dimming controller turns off the switch Q2 to turn off the LED string 312. If the voltage at the terminal VDD decreases below VDD_RESET (e.g., 4 V), for example, due to a failure of the AC power source 320, then the dimming controller 308 is turned off. The light source driving circuit 300 is configured such that when the power switch Q1 is off, the voltage at the terminal VDD is greater than VDD_RESET and less than VDD_ON such that the dimming controller 308 remains powered on while the LED string 312 is turned off.

In operation, when the power switch Q1 is on or turned on, the rectifier 304 converts an input AC voltage $V_{AC}$ to a rectified voltage $V_{REC}$. The voltage at the terminal VDD increases above VDD_ON. The dimming controller 308 is powered on and controls the switch Q2. If the dimming controller 308 turns on the switch Q2, the rectified voltage $V_{REC}$ powers the LED string 312 and charges the inductor L1. A current flows through the switch Q2, the current sensor R1, the inductor L1, and the LED string 312 to ground. If the dimming controller 308 turns off the switch Q2, a current flows through the inductor L1, the LED string 312 and the diode D1. The inductor L1 discharges to power the LED string 312. As such, by controlling the state of the switch Q2, the dimming controller 308 can adjust the regulated power from the power converter 310 and the average current flowing through the LED string 312.

If the power switch Q1 is off or turned off, then a current flows from the AC power source 320 through a current path to the ground of the driving circuit 300. The current path can include the resistor R2, the LED 306, the rectifier 304, the resistor R10, the reference ground of the controller 308, the inductor L1 and the resistor R8. The dimming controller 308 is coupled to the current path via the terminal VDD and therefore can be powered on when the power switch Q1 is off.

Figure 4:
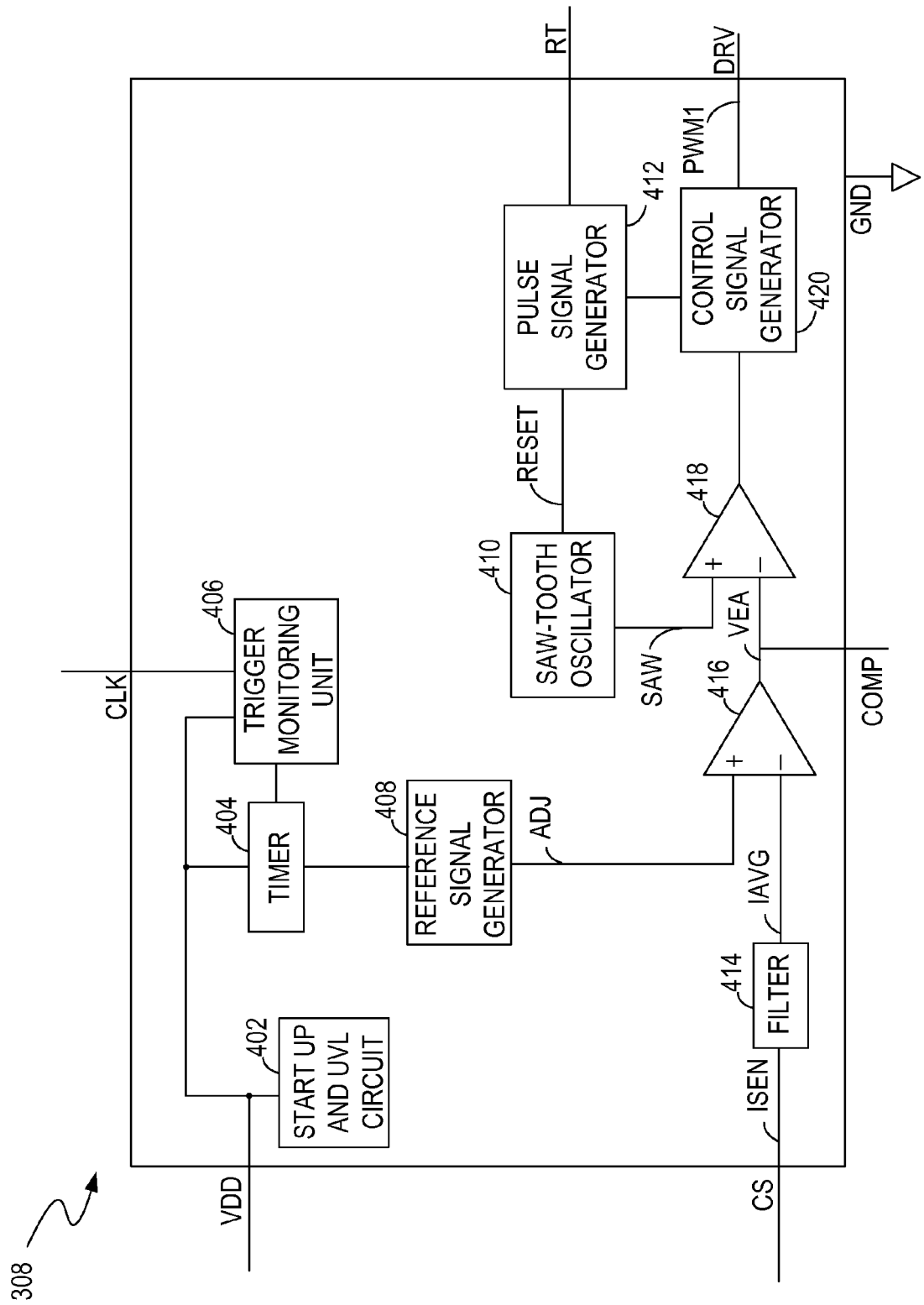
FIG. 4 shows an example of a structure of a dimming controller in FIG. 3, in an embodiment according to the present invention.
Figure 5:
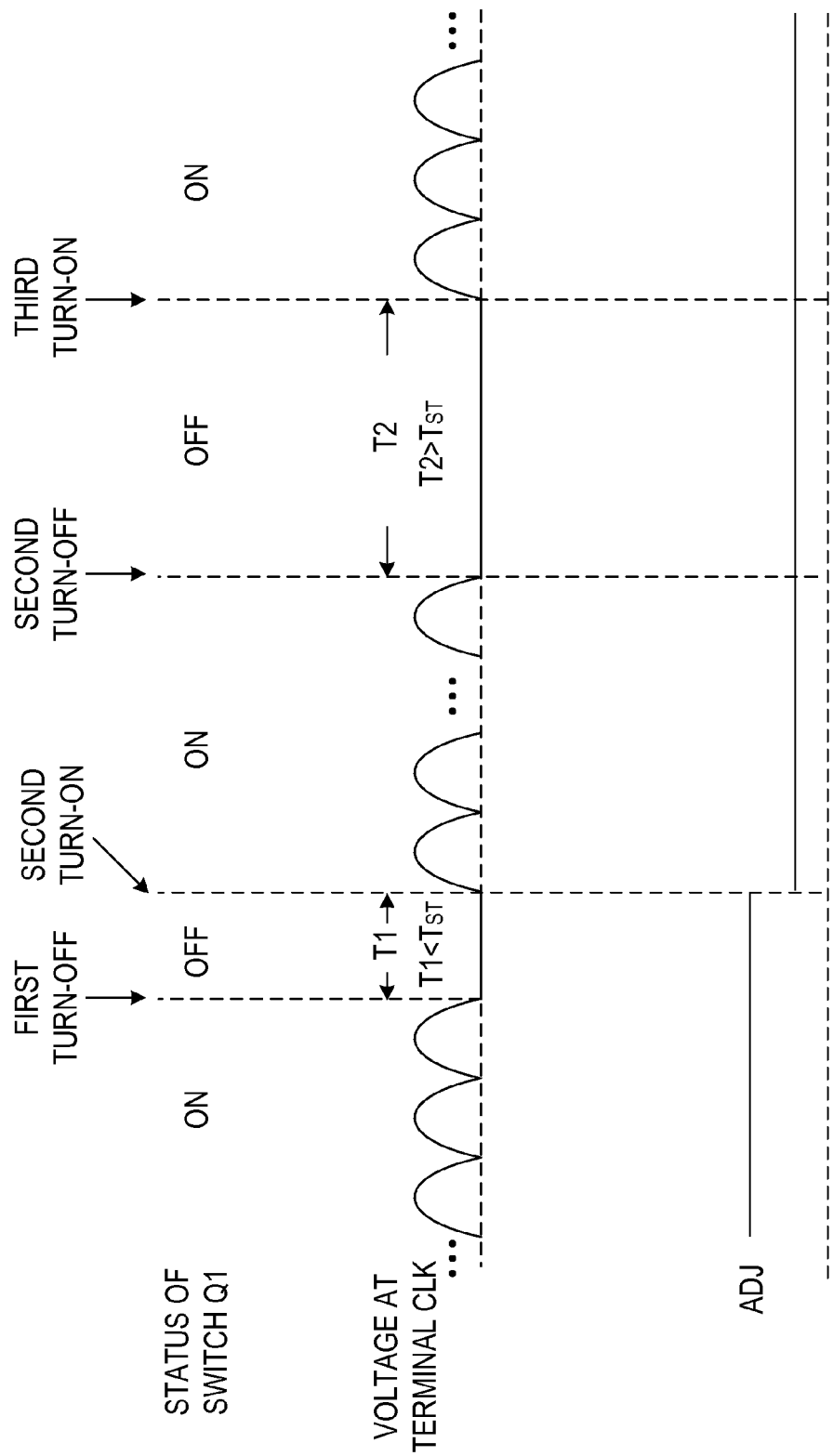
FIG. 5 illustrates an example of a diagram illustrating an operation of a light source driving circuit, in an embodiment according to the present invention.
Figure 6:
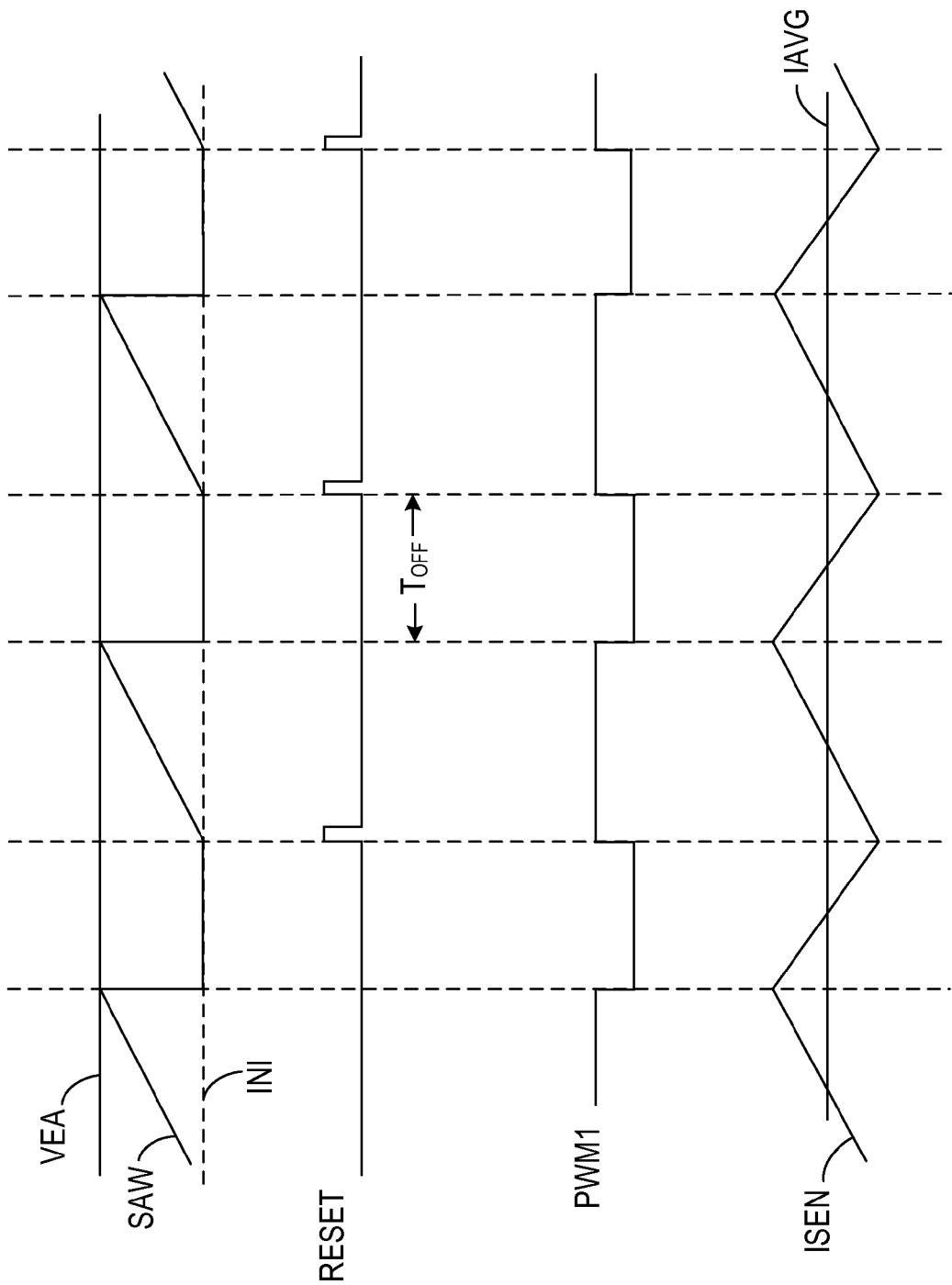
FIG. 6 illustrates examples of signal waveforms associated with the light source driving circuit, in an embodiment according to the present invention.

FIG. 4 shows an example of a structure of the dimming controller 308 in FIG. 3, in an embodiment according to the present invention. FIG. 5 illustrates an example of a diagram illustrating an operation of the light source driving circuit 300, in an embodiment according to the present invention. FIG. 6 illustrates examples of signal waveforms associated with the light source driving circuit 300, in an embodiment according to the present invention. FIG. 4 is described in combination with FIG. 5 and FIG. 6.

The dimming controller 308 includes a start up and under voltage lockout (UVL) circuit 402, a timer 404, a trigger monitoring unit 406, a reference signal generator 408, a saw-tooth oscillator 410, a pulse signal generator 412, a filter 414, an amplifier 416, a comparator 418 and a control signal generator 420. In another embodiment, the filter 414 can be outside of the dimming controller 308.

The start up and under voltage lockout circuit 402 is coupled to the terminal VDD, and selectively turns on one or more components of the dimming controller 308 according to different conditions, e.g., according to the voltage at the terminal VDD and the three predetermined threshold voltages VDD_ON, VDD_OFF and VDD_RESET.

The trigger monitoring unit 406 can receive a switch monitoring signal indicating the state or position of the power switch Q1 through terminal CLK and can generate a driving signal to control the timer 404 accordingly. The timer 404 measures a time period between the time at which the power switch Q1 is turned off and the next time at which the power switch is turned on. The reference signal generator 408 is coupled to the timer 404 and can generate a reference signal ADJ based on an output of the timer. The filter 414 is coupled to the current sensor R1 through the terminal CS, receives the current monitoring signal ISEN, and generates a sensing signal IAVG indicating the average current flowing through the LED string 312 based on the current monitoring signal ISEN. The amplifier 416 generates an error signal VEA by comparing the reference signal ADJ with the sensing signal IAVG. The saw-tooth oscillator 410 generates a saw-tooth signal SAW under control of the pulse signal generator 412. The comparator 418 compares the saw-tooth signal SAW with the error signal VEA. The control signal generator 420 generates a control signal (e.g., a pulse-width modulation signal) PWM1 to control the switch Q2 (shown in FIG. 3) based on the output of the comparator 418 and a pulse signal RESET generated by the pulse signal generator 412.

FIG. 5 shows the state of the power switch Q1, the voltage at the terminal CLK of the dimming controller 308 (e.g., the voltage across the resistor R6) and the state of the reference signal ADJ. When, for example, the power switch Q1 is turned on for the first time (not shown in FIG. 5), the reference signal generator 408 generates the reference signal ADJ having a first value. Accordingly, an average current of the LED string 312 has a first level. When the power switch Q1 is turned off for the first time, a voltage across the resistor R6 drops to zero; therefore, a switch monitoring signal indicating that the power switch Q1 is off can be detected by the dimming controller 308 through the terminal CLK. Similarly, when the power switch Q1 is turned on, the voltage across the resistor R6 rises to a predetermined voltage; therefore, a switch monitoring signal indicating that the power switch Q1 is on can be detected by the dimming controller 308 through the terminal CLK. In one embodiment, the trigger monitoring unit 406 is configured to generate a driving signal to start the timer 404 if the voltage at the terminal CLK has been less than a voltage level $V_{T1}$ (e.g., 3 V) for a time period $T_{EN}$ (e.g., 30 ms) and to stop the timer 404 if the voltage at the terminal CLK increases to a voltage level $V_{T2}$. As such, the length of the time period between the time when the power switch Q1 is turned off and the next time the power switch is turned on can be measured. In the example of FIG. 5, the time period T1 between the time when the power switch Q1 is turned off (labeled "first turn-off") and the next time it is turned on (labeled "second turn-on") is less than a predetermined time period $T_{ST}$. Because T1 is less than $T_{ST}$, the reference signal generator 408 adjusts the reference signal ADJ from a first level to a second level in response to the second turn-on. Accordingly, the average current of the LED string 312 is adjusted from the first value to a second value which is less than the first value, in response to the second turn-on. However, in another embodiment, the average current of the LED string 312 is adjusted from the first value to a second value which is greater than the first value in response to the second turn-on. In the example of FIG. 5, the time period T2 between the next time the power switch Q1 is turned off (labeled "second turn-off") and then turned back on (labeled "third turn-on") is greater than the predetermined time period $T_{ST}$. Because T2 is greater than $T_{ST}$, the reference signal generator 408 maintains the reference signal ADJ unchanged and therefore the average current of the LED string 312 is unchanged. In the dimming controller 308, the amplifier 416 generates the error signal VEA based on the reference signal ADJ and the sensing signal IAVG. As an example, the dimming controller 308 in FIG. 3 is configured to have two dimming levels. After being adjusted to the second level, the reference signal ADJ will be adjusted from the second level back to the first level if the power switch Q1 is turned off and turned on again and the time period between the turn-off and the turn-on is less than the predetermined time period $T_{ST}$. In another embodiment, the dimming controller 308 is configured to have three or more levels. The reference signal ADJ will be adjusted to go through each level and then back to the first level if the power switch Q1 is repeatedly turned off and on and each time period between a turn-off and a next turn-on is less than the predetermined time period $T_{ST}$.

Refer to FIG. 6 and also to FIG. 4. In operation, the control signal generator 420 generates the pulse-width modulation signal PWM1 having a first level (e.g., logic 1) to turn on the switch Q2 in response to a pulse of the pulse signal RESET. When the switch Q2 is turned on, the current monitoring signal ISEN increases. The saw-tooth signal SAW generated by the saw-tooth signal generator 410 starts to increase from an initial level INI in response to a pulse of the pulse signal RESET. When the voltage of the saw-tooth signal SAW increases to the voltage of the error signal VEA, the control signal generator 420 generates the pulse-width modulation signal PWM1 having a second level (e.g., logic 0) to turn off the switch Q2 such that the current monitoring signal ISEN decreases. The saw-tooth signal SAW is reset to the initial level INI until the next pulse of the pulse signal RESET is received by the saw-tooth signal generator 606. The saw-tooth signal SAW starts to increase from the initial level INI again in response to the next pulse.

In one embodiment, a duty cycle of the pulse-width modulation signal PWM1 is determined by the error signal VEA. If the voltage of the sensing signal IAVG is less than the voltage of the reference signal ADJ, then the amplifier 416 increases the voltage of the error signal VEA so as to increase the duty cycle of the pulse-width modulation signal PWM1. Accordingly, the average current flowing through the LED string 312 increases until the voltage of the sensing signal IAVG reaches the voltage of the reference signal ADJ. If the voltage of the sensing signal IAVG is greater than the voltage of the reference signal ADJ, then the amplifier 416 decreases the voltage of the error signal VEA so as to decrease the duty cycle of the pulse-width modulation signal PWM1. Accordingly, the average current flowing through the LED string 312 decreases until the voltage of the signal IAVG drops to the voltage of the reference signal ADJ. As such, the average current flowing through the LED string 312 can be maintained to be substantially equal to a target current level which is determined by the reference signal ADJ.

In the dimming controller 308, the pulse signal generator 412 is coupled to ground through terminal RT and the resistor R7 and generates the pulse signal RESET, which can turn on the switch Q2. The frequency of the pulse signal RESET is determined by the resistance of the resistor R7.

If the voltage at the terminal VDD decreases below VDD_RESET (e.g., due to a failure of the AC power source 320), then the dimming controller 308 is turned off and the reference signal ADJ will be set to a default level (e.g., the first level) after the dimming controller 308 is turned on again.

Figure 7:
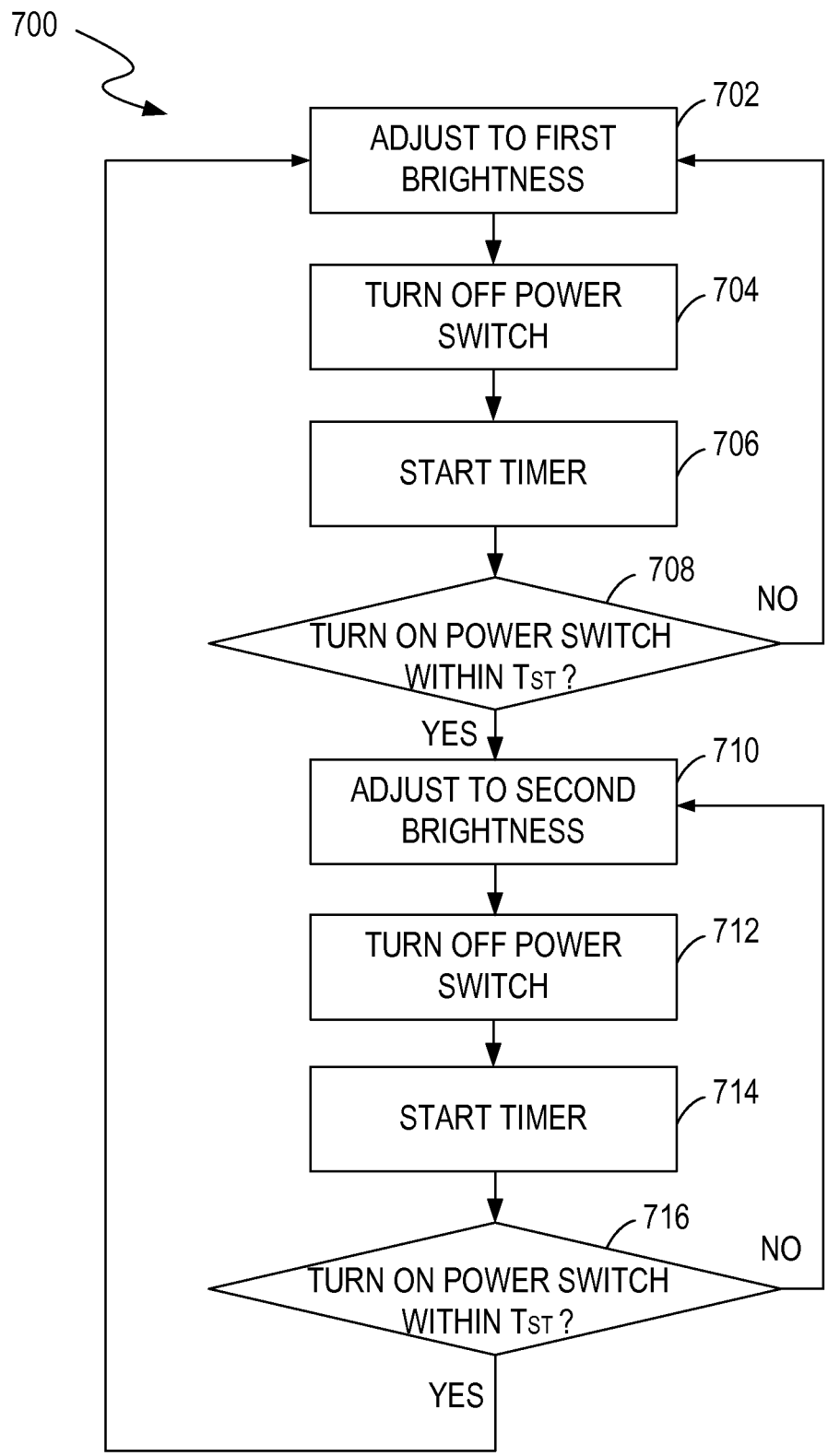
FIG. 7 shows a flowchart of a method for adjusting power of a light source, in an embodiment according to the present invention.

FIG. 7 shows a flowchart 700 of a method for adjusting power of a light source, in an embodiment according to the present invention. FIG. 7 is described in combination with FIG. 3.

In block 702, a light source, e.g., the LED string 312, is powered on and a brightness of the LED string 312 is adjusted to a first level by a dimming controller 308 in a light source driving circuit 300. In block 704, a power switch, e.g., a power switch Q1 coupled between an AC power source 320 and a rectifier 304 of the light source driving circuit 300, is turned off. In block 706, a timer 404 is started in response to the power switch Q1 being turned off. In block 708, if the power switch Q1 is turned on within a predetermined time period $T_{ST}$ after the power switch is turned off, as measured by the timer 404, then the flowchart 700 goes to block 710; otherwise, the flowchart 700 goes back to block 702 such that the brightness of the LED string 312 remains at the first level.

In block 710, the brightness of the LED string 312 is adjusted from the first level to a second level. In block 712, the power switch Q1 is turned off again. In block 714, the timer 404 is started again, in response to the power switch Q1 being turned off in block 712. In block 716, if the power switch Q1 is turned on within a predetermined time period $T_{ST}$ after being turned off in block 712, as measured by the timer 404, then the flowchart 700 goes to block 702 to adjust the brightness of the LED string 312 from the second level to the first level; otherwise, the flowchart 700 goes back to block 710 such that the brightness of the LED string 312 remains at the second level.

Figure 8:
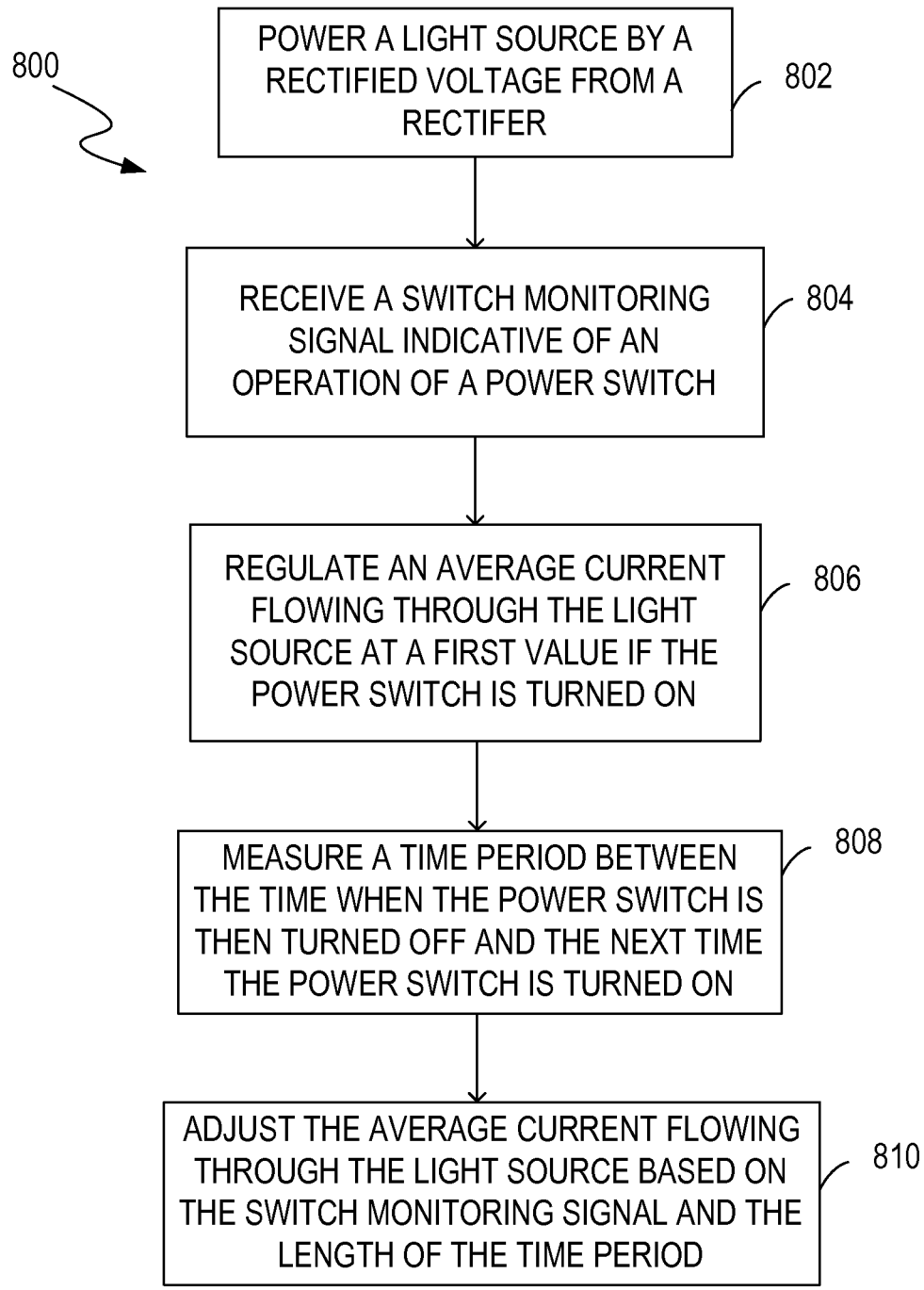
FIG. 8 shows another flowchart of a method for adjusting power of a light source, in an embodiment according to the present invention.

FIG. 8 shows another flowchart 800 of a method for adjusting power of a light source, in an embodiment according to the present invention. FIG. 8 is described in combination with FIG. 3.

In block 802, a light source (e.g., an LED string 312) is powered by a rectified voltage from a rectifier 304. In block 804, a switch monitoring signal indicative of the state or position of a power switch Q1 that transfers power from an AC power source 320 to the rectifier 304 is received by a dimming controller 308. The state or position of the power switch Q1 is selected from a group that includes on and off. In block 806, an average current flowing through the light source is regulated by the dimming controller 308 at a first value if the power switch Q1 is turned on. In block 808, a time period between the time when the power switch Q1 is then turned off and the next time the power switch is turned on is measured by a timer 404. In block 810, the average current flowing through the light source is adjusted by the dimming controller 308 based on the switch monitoring signal and the length of the time period measured in block 808. In one embodiment, the average current flowing through the light source is adjusted from the first value to a second value if the time period is less than a predetermined time period, while the average current is maintained at the first value if the time period is greater than the predetermined time period.

Accordingly, embodiments according to the present invention provide a light source driving circuit that can adjust power of a light source according to a switch monitoring signal indicative of an operation of a power switch, e.g., an illuminated on/off switch with an illuminated indicator. Advantageously, as described above, users can adjust the light output of the light source through operation of the power switch. Therefore, extra components for dimming, such as an external dimmer or a specially designed switch with adjusting buttons, can be avoided and costs can be reduced. Furthermore, the dimming controller in the light source driving circuit can still be powered on even if the power switch is off due to a current enabled by the illuminated indicator. Therefore, the dimming controller can change the brightness of the light source or memorize the brightness of the light source if the power switch is turned off and then turned on again, depending on the length of the time period between the turn-off and turn-on.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A dimming controller for a light source, said dimming controller comprising:
   a monitoring terminal operable for receiving a switch monitoring signal indicative of an on/off state of a power switch, wherein said power switch transfers power from an AC power source to a rectifier and wherein a power converter receives input power from said rectifier and provides output power to said light source if said power switch is on, and wherein an average current flowing through said light source has a first value when said power switch is on;
   a control terminal operable for providing a control signal to adjust said average current based on said switch monitoring signal and control dimming of said light source;
   a power terminal operable for receiving power from said AC power source through said power switch when said power switch is on, and operable for receiving power from said AC power source through an illuminated indicator when said power switch is off;
   a trigger monitoring unit operable for receiving said switch monitoring signal and for generating a driving signal in response to operation of said power switch;
   a timer, coupled to said trigger monitoring unit and controlled by said driving signal, operable for measuring the period of time between when said power switch is turned off and when said power switch is next turned on; and
   a reference signal generator coupled to said timer and operable for generating a reference signal based on an output of said timer.

2. The dimming controller of claim 1, wherein said control terminal is operable for providing said control signal to adjust said average current from said first value to a second value if said switch monitoring signal indicates that said power switch is turned on within a predetermined time period after said power switch was turned off.

3. The dimming controller of claim 1, wherein said control terminal is operable for providing said control signal to maintain said average current at said first value if said switch monitoring signal indicates that said power switch is turned on after expiration of a predetermined time period that began when said power switch was turned off.

4. The dimming controller of claim 1, wherein said reference signal generator is operable for adjusting said reference signal from a first level to a second level if said period of time is less than a predetermined time period, and wherein said reference signal generator is operable for maintaining said reference signal at said first level if said period of time is greater than a predetermined time period.

5. The dimming controller of claim 1, further comprising:
   an amplifier operable for generating an error signal by comparing said reference signal and a sensing signal indicating said average current flowing through said light source,
   wherein said control signal is determined based on said error signal.

6. The dimming controller of claim 5, further comprising:
   a current monitoring terminal operable for receiving a current monitoring signal indicating a current flowing through said light source; and
   a filter coupled to said current monitoring terminal and operable for generating said sensing signal based on said current monitoring signal.

7. A driving circuit comprising:
   a power converter operable for receiving input power from a rectifier and providing output power to a light source, wherein a power switch transfers power from an AC power source to said rectifier when said power switch is on;
   a dimming controller, coupled to said power converter, and operable for receiving a switch monitoring signal indicative of an on/off state of said power switch, wherein an average current flowing through said light source has a first value if said power switch is on, and wherein said dimming controller is operable for adjusting said average current based on said switch monitoring signal and controlling dimming of said light source;
   a current path coupled to said dimming controller, wherein a current flows from said AC power source through said current path to ground when said power switch is off;
   a trigger monitoring unit operable for receiving said switch monitoring signal and for generating a driving signal in response to operation of said power switch;
   a timer, coupled to said trigger monitoring unit and controlled by said driving signal, operable for measuring the period of time between when said power switch is turned off and when said power switch is next turned on; and
   a reference signal generator coupled to said timer and operable for generating a reference signal based on an output of said timer.

8. The driving circuit of claim 7, further comprising:
   a control switch coupled to said light source,
   wherein said dimming controller is operable for adjusting said average current flowing through said light source by controlling said control switch according to said switch monitoring signal, and wherein said dimming controller is operable for adjusting said average current from said first value to a second value if said switch monitoring signal indicates that said power switch is turned on within a predetermined time period after said power switch was turned off.

9. The driving circuit of claim 7, further comprising:
   a control switch coupled to said light source,
   wherein said dimming controller is operable for adjusting said average current flowing through said light source by controlling said control switch according to said switch monitoring signal, and wherein said dimming controller is operable for maintaining said average current at said first value if said switch monitoring signal indicates that said power switch is turned on after expiration of a predetermined time period that began when said power switch was turned off.

10. The driving circuit of claim 7, wherein said reference signal generator is operable for adjusting said reference signal from a first level to a second level if said period of time is less than a predetermined time period, and wherein said reference signal generator is operable for maintaining said reference signal at said first level if said period of time is greater than a predetermined time period.

11. The driving circuit of claim 7, wherein said dimming controller further comprises:
   an amplifier operable for generating an error signal by comparing said reference signal and a sensing signal indicating said average current flowing through said light source,
   wherein said control signal is determined based on said error signal.

12. The driving circuit of claim 11, further comprising:
a current sensor operable for providing a current monitoring signal indicating a current flowing through said light source; and
a filter coupled to said current sensor and operable for generating said sensing signal based on said current monitoring signal.

* * * * *